June 22, 1965 F. CUTTAT 3,190,013
MNEMOTECHNIC DEVICE AND METHOD OF OPERATION THEREOF
Filed Oct. 4, 1962

INVENTOR
François Cuttat
BY
ATTORNEY

United States Patent Office 3,190,013
Patented June 22, 1965

3,190,013
MNEMOTECHNIC DEVICE AND METHOD OF
OPERATION THEREOF
Francois Cuttat, 10 Ave. Dapples, Lausanne,
Vaud, Switzerland
Filed Oct. 4, 1962, Ser. No. 228,397
Claims priority, application Switzerland, Oct. 10, 1961,
11,791/61
1 Claim. (Cl. 35—35)

In the study of a foreign language, great difficulty resides in memorizing the vocabulary and grammar. For this purpose, use is generally made of a grammar or a dictionary which has the drawback that the student loses time in being obligated to turn over the pages of often voluminous didactic books.

The present invention, which eliminates this drawback, has for its object a mnemotechnic device, distinguished by the fact that it comprises means for grouping or binding several sheets, each of which is subdivided into detachable slips. Each slip is provided on its front face with an indication of the question posed or the problem to be solved, and on the rear face, with the reply to the question or the solution of the problem. Also, means are provided for selecting at random one or the other of the faces of each of said slips.

The device is arranged so as to permit rapid memorizing of the question posed and its answer or the problem to be solved and its solution by manipulation of the slips detached from the sheet and the said selecting means.

The invention also has for another object the method of operating the device.

The accompanying drawing illustrates by way of example, one embodiment of the mnemotechnic device according to the invention, applied to the memorizing of the vocabulary of the German language for a person whose mother tongue is French.

Figure 1:
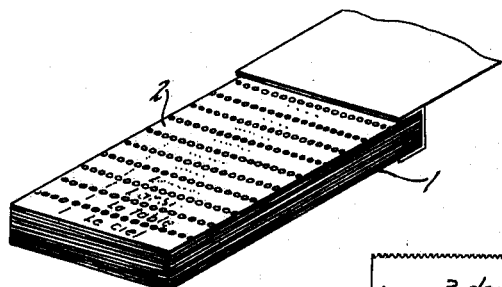
FIGURE 1 is a diagrammatic view in perspective of a pad of sheets, each provided with detachable individual slips, the cover sheet of the pad being shown partly in an outwardly folded position.
Figure 2:
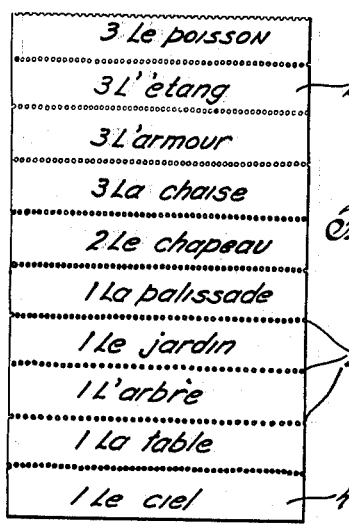
FIGURES 2 and 3 show, on a larger scale, a sheet of the block represented in FIGURE 1, FIGURE 2 being a view in elevation of the front face, and FIGURE 3 a view in elevation of the back face of the said sheet.
Figure 3:
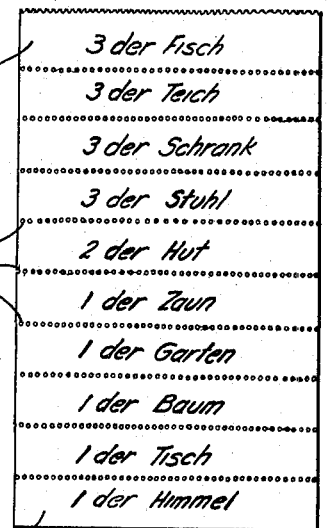
Figure 4:
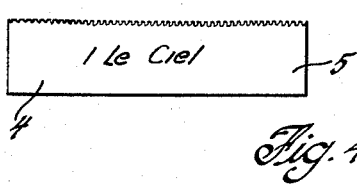
FIGURES 4 and 5 represent a slip detached from the sheet shown in FIGURES 2 and 3, FIGURE 4 being a view in elevation of the front face, and FIGURE 5 a view in elevation of the back face.
Figure 5:
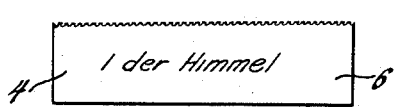

The mnemotechnic device, in the embodiment shown in the drawing, comprises a pad 1 (FIG. 1) of sheets, for example, bound together by stitching. Each of the sheets of pad 1, for example sheet 2 (FIGS. 2 and 3), is subdivided, for example by parallel rows of perforations 3, into detachable slips having printed thereon on the front face the word to be translated, and on the back face its translation. Thus, for example, on slip 4 (FIGS. 4 and 5) are printed on the front side 5 the word "ciel" (sky) preceded by the article "le" (the), indicating the gender of the word, and by a number "1" indicating the number of the lesson of the vocabulary and, on the back face 6, the translation of the word in German.

Figure 6:
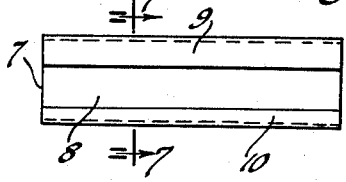
FIGURES 6 to 8 represent a sheath of transparent material, FIGURE 6 being a view in elevation of the front face, FIGURE 7 a cross sectional view, along line VII—VII of FIGURE 6, and FIGURE 8 a view in elevation of the back face of the said sheath.
Figure 7:
Figure 8:
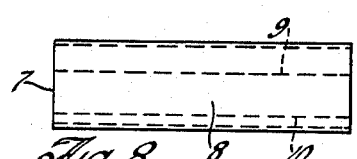
Figure 9:
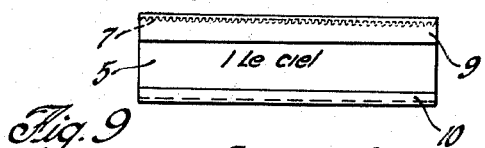
FIGURES 9 and 10 represent a sheath enclosing a slip, FIGURE 9 being a view in elevation of the front wall, and FIGURE 10 a view in elevation of the rear wall of the said sheath.
Figure 10:
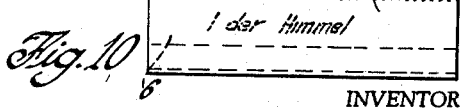

The slip 4 is designed, after having been detached from the sheet 2, to be inserted into a sheath 7 (FIGS. 6 to 8) of transparent material and of a generally elongated and flattened C shape. The back face 6 of the slip is in contact with the rear wall 8 of the sheath and the text printed on the front face 5 of the slip is placed between the spaced upper and lower flanges 9 and 10 forming the front wall of the sheath, as shown in FIGS. 9 and 10. In this C shape of the sheath, the free portions of the flanges 9 and 10 comprise the front wall and provide an opening therebetween, whereas the rear wall 8 is a smooth continuous surface.

After having been detached from the sheet 2, each of the other slips is inserted into a sheath identical to the sheath 7, in the same position as that described for the slip 4, each slip being housed in a separate sheath.

By way of example, the method of operation of the mnemotechnic device is characterized in that after having successively detached each of the slips from one of the sheets of the pad, said sheets being printed on both faces, each slip is inserted in its own transparent sheath by placing the back face 6 of the slip so that it is legible through the transparent rear wall 8. After having selected by touch the open face of the sheath formed by parts 9 and 10 and memorized the question posed on the front face 5 of the slip, by then turning around the sheath, the user has the opportunity of verifying, by reading the text appearing on the rear face 6 of the slip which is visible through the transparent rear wall 8 of the sheath, the memorization of the slip and its contents.

The device described could comprise several variations. For instance, instead of a pad of sheets, use could be made of another binding means, such as slips joined by gluing or insetting in a didactic book, the insetting being, for example, in the form of loose sheets, or glued, sewn or bound sheets. In such a case, the sheets have the same dimensions of the book or cover.

The sheets of the pad could be in paper, cardboard, plastic material, metal, or in any other material. They could be of any color, which would permit conditioning the memory of the user by concentrating it on the word or on the text to be memorized. Each of the slips, instead of being printed, could be engraved, stencilled or comprise a photographic reproduction of words, figures, numbers, or be composed of signs having on one of the faces of the slip the question posed or the problem to be solved and on the other face, the reply or the solution respectively, or even be blank, thus permitting the user himself to fill in the slips with handwritten inscriptions.

Instead of utilizing a transparent sheath, each of the slips could also be provided with one smooth face, with the other face being uneven or provided with means permitting the user to differentiate by touch the face having the posed question from the one provided with its reply.

The method of operation of the device described has several advantages among which are the following. It permits rapidly memorizing a vocabulary of a foreign language by arranging in a pad the entire vocabulary to be studied and by means of detachable slips means for separating the words or phrases constituting the vocabulary. The manipulation of the slips allows the user to memorize the text to be studied by means of his conditioned reflexes, which facilitates memorizing of said text.

Moreover, the withdrawal of the slips permits the user to know definitely whether a word of the vocabulary of the foreign language is or is not memorized.

I claim:

As an article of manufacture, a mnemotechnic device comprising, a plurality of slips adapted to be withdrawn from a receptacle wherein they are concealed from the view of the user thereof, each said slip having inscriptions thereon, each said slip being adapted to be easily detached from a single sheet containing a plurality of said slips, each of said slips provided on the front face with data to be interpreted by memory and, on the rear face, with the indication of the exact interpretation of the data carried on the front face of the slips, and means for differentiating between the front and rear faces thereof by mere touch and at random to facilitate rapid memorization of the inscription appearing on said each slip, said means comprising a smooth surface on one face of each of said slips and a rough surface on the opposite face of each of said slips.

References Cited by the Examiner

UNITED STATES PATENTS

| 235,448 | 12/80 | Newman | 283—45 |
| 655,425 | 8/00 | Wadleigh | 283—52 |
| 1,110,367 | 9/14 | Wood | 283—52 |
| 1,149,081 | 8/15 | Rand | 40—16 |
| 1,732,815 | 10/29 | Knight | 35—48.1 |

FOREIGN PATENTS

| 25,259 | 7/52 | Finland. |

JEROME SCHNALL, *Primary Examiner.*

GEORGE A. NINAS, Jr., *Examiner.*